United States Patent
Huang et al.

(10) Patent No.: US 10,623,940 B2
(45) Date of Patent: Apr. 14, 2020

(54) TERMINAL MOBILITY MANAGEMENT METHOD AND NETWORK DEVICE

(71) Applicant: CLOUDMINDS (SHENZHEN) ROBOTICS SYSTEMS CO., LTD., Shenzhen, Guandong (CN)

(72) Inventors: William Xiao-qing Huang, New York City, NY (US); Haitao Jiang, Guandong (CN); Zhenkai Wang, Guandong (CN)

(73) Assignee: CLOUDMINDS (SHENZHEN) ROBOTICS SYSTEMS CO., LTD., Shenzhen, Guangdong (CN)

(*) Notice: Subject to any disclaimer, the term of this patent is extended or adjusted under 35 U.S.C. 154(b) by 0 days.

(21) Appl. No.: 16/420,735

(22) Filed: May 23, 2019

(65) Prior Publication Data

US 2019/0281441 A1 Sep. 12, 2019

Related U.S. Application Data

(63) Continuation of application No. PCT/CN2016/098609, filed on Sep. 9, 2016.

(51) Int. Cl.
*H04W 24/00* (2009.01)
*H04W 8/08* (2009.01)
(Continued)

(52) U.S. Cl.
CPC .......... *H04W 8/08* (2013.01); *H04W 24/00* (2013.01); *H04W 24/10* (2013.01);
(Continued)

(58) Field of Classification Search
CPC ................ H04W 64/00; H04W 4/02
(Continued)

(56) References Cited

U.S. PATENT DOCUMENTS

2012/0140652 A1 6/2012 Pan
2017/0331670 A1* 11/2017 Parkvall ............ H04W 52/0274

FOREIGN PATENT DOCUMENTS

CN  101115290 A  1/2008
CN  101867964 A  10/2010
(Continued)

OTHER PUBLICATIONS

International Search Report dated Mar. 31, 2017; PCT/CN2016/098609.

*Primary Examiner* — Temica M Beamer

(57) ABSTRACT

A terminal mobility management method includes: sending, by a first network device, uplink signal configuration information for an idle terminal to a terminal; receiving, by the first network device, uplink signal measurement information sent by a first base station, wherein the uplink signal measurement information is obtained by measurement by the first base station upon receiving an uplink signal carrying a terminal identifier sent by the terminal based on the uplink signal configuration information; and configuring, by the first network device, mobility for the terminal based on the uplink signal measurement information, wherein the configuring mobility is configuring a serving base station for the terminal when a downlink service from the terminal arrives at a network side, such that the terminal receives paging information from the serving base station.

17 Claims, 7 Drawing Sheets

---

A first network device sends uplink signal configuration information for an idle terminal to a terminal — 201

The first network device receives uplink signal measurement information from a first base station, wherein the uplink signal measurement information is obtained by measurement by the first base station upon receiving an uplink signal carrying a terminal identifier sent by the terminal based on the uplink signal configuration information — 202

The first network device configures mobility for the terminal based on the uplink signal measurement information, wherein the configuring mobility is configuring a serving base station such that the terminal receives paging information from the serving base station when a downlink service from the terminal arrives at a network side — 203

(51) Int. Cl.
*H04W 24/10* (2009.01)
*H04W 68/00* (2009.01)
*H04W 72/04* (2009.01)
H04W 88/08 (2009.01)
H04W 92/04 (2009.01)
H04W 92/10 (2009.01)
H04W 92/20 (2009.01)

(52) U.S. Cl.
CPC ....... *H04W 68/005* (2013.01); *H04W 72/042* (2013.01); *H04W 88/08* (2013.01); *H04W 92/045* (2013.01); *H04W 92/10* (2013.01); *H04W 92/20* (2013.01)

(58) Field of Classification Search
USPC .............................................. 455/456.1, 458
See application file for complete search history.

(56) References Cited

FOREIGN PATENT DOCUMENTS

| | | |
|---|---|---|
| CN | 102572879 A | 7/2012 |
| WO | 2007106000 A1 | 9/2007 |

* cited by examiner

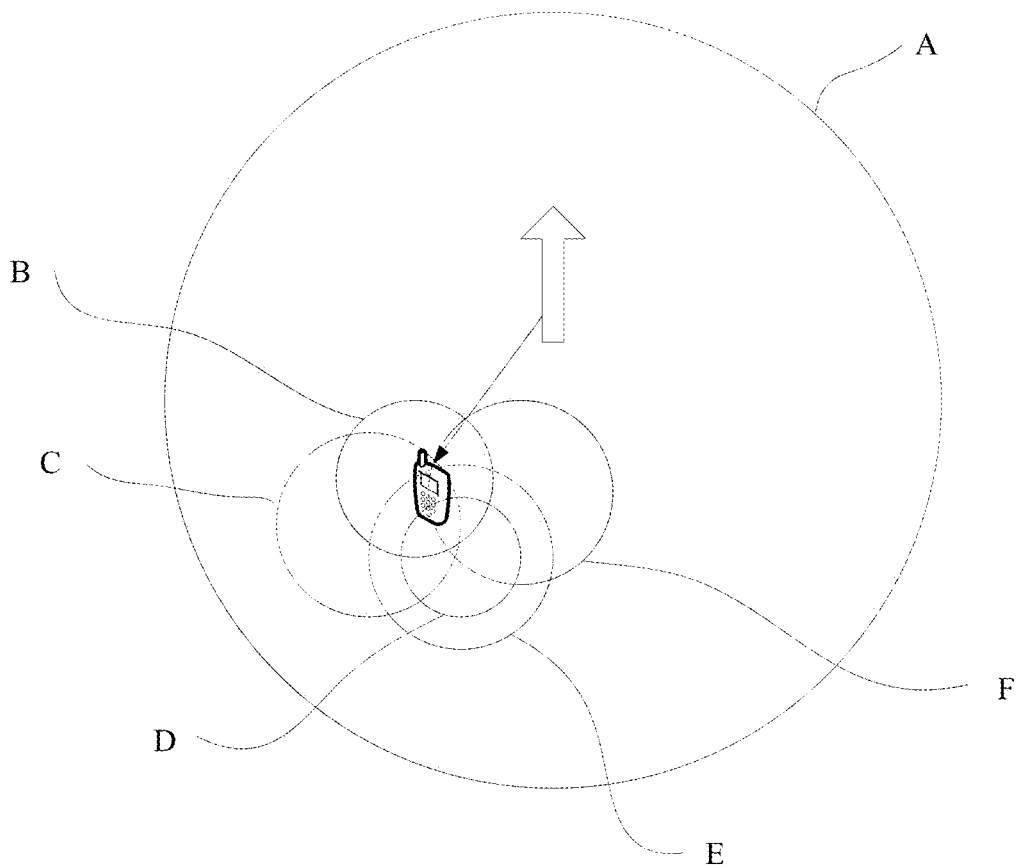

FIG. 3

```
┌─────────────────────────────────────────────────────────────┐
│ A first network device sends uplink signal configuration    │ ─── 201
│ information for an idle terminal to a terminal              │
└─────────────────────────────────────────────────────────────┘
                              │
                              ▼
┌─────────────────────────────────────────────────────────────┐
│ The first network device receives uplink signal measurement │
│ information from a first base station, wherein the uplink   │
│ signal measurement information is obtained by measurement   │ ─── 202
│ by the first base station upon receiving an uplink signal   │
│ carrying a terminal identifier sent by the terminal based   │
│ on the uplink signal configuration information              │
└─────────────────────────────────────────────────────────────┘
                              │
                              ▼
┌─────────────────────────────────────────────────────────────┐
│ The first network device configures mobility for the        │
│ terminal based on the uplink signal measurement information,│
│ wherein the configuring mobility is configuring a serving   │ ─── 203
│ base station such that the terminal receives paging         │
│ information from the serving base station when a downlink   │
│ service from the terminal arrives at a network side         │
└─────────────────────────────────────────────────────────────┘
```

FIG. 4

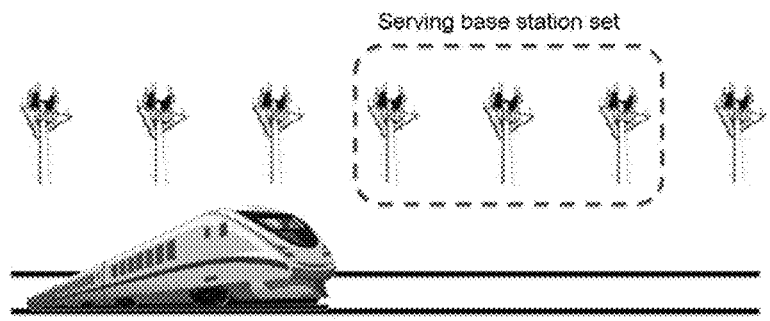

FIG. 5

| A second network device receives an uplink signal carrying a terminal identifier sent from a terminal based on uplink signal configuration information for an idle terminal, and obtains uplink signal measurement information by measurement | 301 |

↓

| The second network device sends the uplink signal measurement information to the first network device, such that the first network device configures mobility for the terminal based on the uplink signal measurement information, wherein the configuring mobility is configuring a serving base station for the terminal such that the terminal receives paging information at the serving base station | 302 |

FIG. 6

A terminal sends an uplink signal carrying a terminal identifier based on uplink signal configuration information for an idle terminal sent by a first network device, such that a first base station obtains uplink signal measurement information by measurement upon receiving the uplink signal, and the first network device receives the uplink signal measurement information from the first base station and configures mobility for the terminal based on the uplink measurement information, wherein the configuring mobility is configuring a serving base station for the terminal when a downlink service arrives at a network side, such that the terminal receives paging information at the serving base station

TERMINAL MOBILITY MANAGEMENT METHOD AND NETWORK DEVICE

CROSS-REFERENCE TO RELATED APPLICATIONS

This application is a continuation of International Application No. PCT/CN2016/098609, with an international filing date of Sep. 9, 2016, the entire contents of which are incorporated herein by reference.

TECHNICAL FIELD

Embodiments of the present application relate to the field of communications, and in particular, relate to a terminal mobility management method and a network device.

BACKGROUND

By mobility management (MM), location information, security and service connectivity and the like aspects of terminals are managed, such that the terminals maintain an optimal connection to a communication network, assurance is provided for application of various network services.

In conventional GSM/WCDMA/LTE, terminal mobility management is based on downlink pilot signal/downlink reference signal measurements and measurement reporting by the terminals for base stations. For example, in an LTE system, mobility of an idle terminal is managed by the terminal by measuring a receive strength/quality of downlink reference signals of the base station, and the terminal selects an suitable base station to reside based on a base station selection or base station reselection rule; and mobility of an active terminal is managed by the terminal by measuring a receive strength/quality of the downlink reference signals of the base station and reporting a measurement result, and a serving base station makes a decision for handover based on a specific rule, and issues a handover instruction to the terminal to complete handover.

Ultra-dense networking is an important technical trend of 5G network. Density of the future 5G network would possibly be 10 times or even greater over that of the conventional 4G network. This means that relative to a 4G system, future 5G terminals may possibly simultaneously detect 10 times or more base stations.

SUMMARY

An embodiment of the present application provides a terminal mobility management method. The method includes: sending, by a first network device, uplink signal configuration information for an idle terminal to a terminal; receiving, by the first network device, uplink signal measurement information sent by a first base station, wherein the uplink signal measurement information is obtained by measurement by the first base station upon receiving an uplink signal carrying a terminal identifier sent by the terminal based on the uplink signal configuration information; and configuring, by the first network device, mobility for the terminal based on the uplink signal measurement information, wherein the configuring mobility is configuring a serving base station for the terminal when a downlink service from the terminal arrives at a network side, such that the terminal receives paging information from the serving base station Another embodiment of the present application provides a terminal mobility management method. The method includes: receiving, by a second network device, an uplink signal carrying a terminal identifier sent from a terminal based on uplink signal configuration information for an idle terminal sent by a first network device; obtaining, by a second network device, uplink signal measurement information by measurement; and sending, by the second network device, the uplink signal measurement information to the first network device, such that the first network device configures mobility for the terminal based on the uplink signal measurement information, wherein the configuring mobility is configuring a serving base station for the terminal such that the terminal receives paging information at the serving base station.

Still another embodiment of the present application provides a first network device. The device includes: at least one processor; and a memory communicably connected to the at least one processor; wherein the memory stores instructions executable by the at least one processor, wherein, the instructions, when being executed by the at least one processor, cause the at least one processor to perform the steps of: sending uplink signal configuration information for an idle terminal to a terminal; receiving, by the first network device, uplink signal measurement information sent by a first base station, wherein the uplink signal measurement information is obtained by measurement by the first base station upon receiving an uplink signal carrying a terminal identifier sent by the terminal based on the uplink signal configuration information; and configuring, by the first network device, mobility for the terminal based on the uplink signal measurement information, wherein the configuring mobility is configuring a serving base station for the terminal when a downlink service from the terminal arrives at a network side, such that the terminal receives paging information from the serving base station.

BRIEF DESCRIPTION OF THE DRAWINGS

For a clearer description of the technical solutions according to the embodiments of the present application, hereinafter brief description is given with reference to the accompanying drawings for illustrating the embodiments. Apparently, the accompanying drawings described hereinafter only illustrate some embodiments of the present application, and other accompanying drawings may also be derived based on these accompanying drawings.

FIG. 3 is a schematic diagram of base station distribution and mobility management in a communication network;

FIG. 4 is a flowchart of a terminal mobility management method according to a first embodiment of the present application;

FIG. 5 is a schematic diagram of a train application scenario according to an embodiment of the present application;

FIG. 6 is a flowchart of a terminal mobility management method according to a second embodiment of the present application;

FIG. 7 is a flowchart of a terminal mobility management method according to a third embodiment of the present application;

DETAILED DESCRIPTION

For clear description of objectives, technical solutions, and advantages of the present application, the present application is further described in detail below by reference to the embodiments and the accompanying drawings. It should be understood that the specific embodiments described herein are only intended to explain the present application instead of limiting the present application.

Some devices in the embodiments of the present application are described hereinafter.

Anchor base station (anchor BS) and mobility management server (MMS): If a base station having super long-range coverage or basic coverage is deployed in a coverage region, the base station is generally defined as the anchor base station, which may also be referred to as the mobility management server; and if no base station having super long-range coverage or basic coverage is deployed in the coverage area, a mobility management server may be deployed on a core network side to control a plurality of base stations in the coverage region thereof. The mobility management server may be located in a network element in the core network or may be located in a network element in a wireless network. When a base station having super long-range coverage is deployed in a region, the base station is generally used as an anchor for mobility management in this region, that is, a controller, i.e., the mobility management server. In addition, since the anchor is actually a base station, the anchor is also referred to as an anchor base station. When all the base stations in a region almost have the same coverage range and no such base station having super long-range coverage is deployed (that is, no anchor base station is deployed), a mobility management server needs to be deployed to connect to various base stations in the region and control various first base stations (interpretation will be given hereinafter) to receive uplink signals from terminals and configure serving base stations for the terminals. First base station: The first base station is configured by the anchor base station and the mobility management server based on a predetermined rule. The first base station receives the uplink signals from the terminals, measures the uplink signals to obtain uplink signal measurement information, and sends the obtained uplink signal measurement information to the anchor base station and the mobility management server.

Serving base station: The serving base stations are all base stations configured by the anchor base station and the mobility management server for idle terminals to provide communication services for these terminals.

Figure 1:
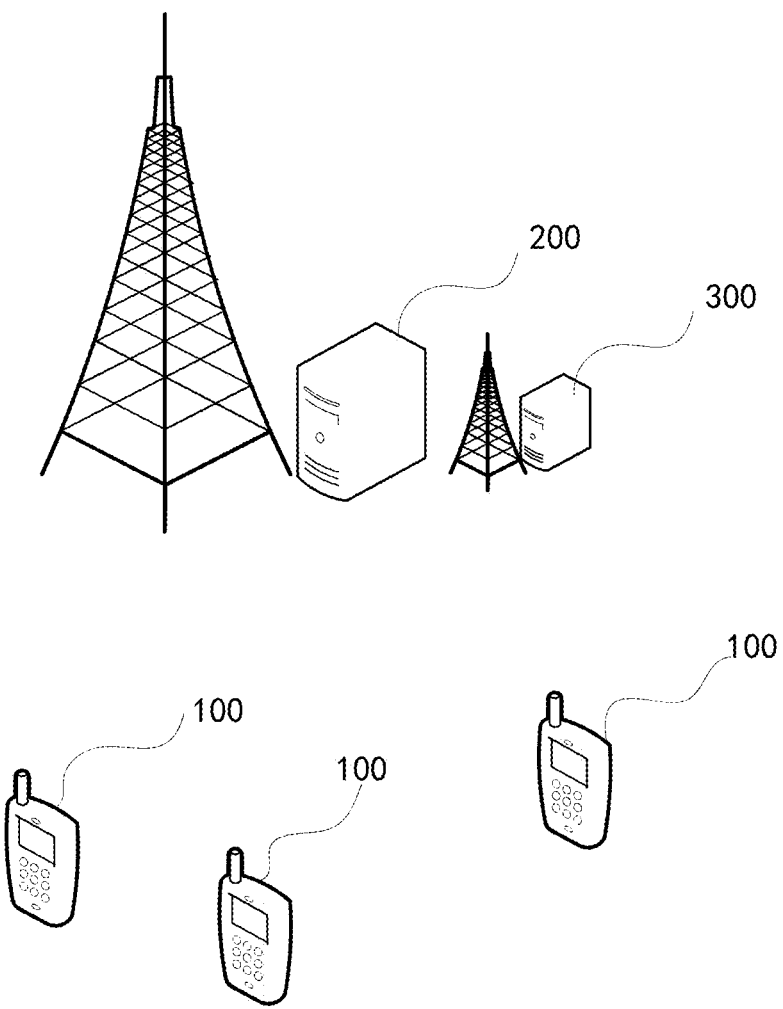
FIG. 1 is a schematic diagram of an application environment according to an embodiment of the present application.

FIG. 1 is a schematic diagram of an application environment according to an embodiment of the present application. As illustrated in FIG. 1, the embodiment of the present application may be applied to a mobile communication network to implement mobility management of a terminal 100 by a first network device 200. The first network device 200 may be a device in an anchor base station or a mobility management server, and the first network device 200 is positioned within an entity base station, wherein functions of a server are integrated in the first network device 200 and the first network device 200 acquires a signal from the terminal via an interface. The terminal 100 may be a smart phone or a mobile terminal having the mobile communication function. A second network device 300 may be a device in a first base station, and the second network device 300 measures an uplink signal from the terminal 100 and sends uplink signal measurement information to the first network device 200.

Figure 2:
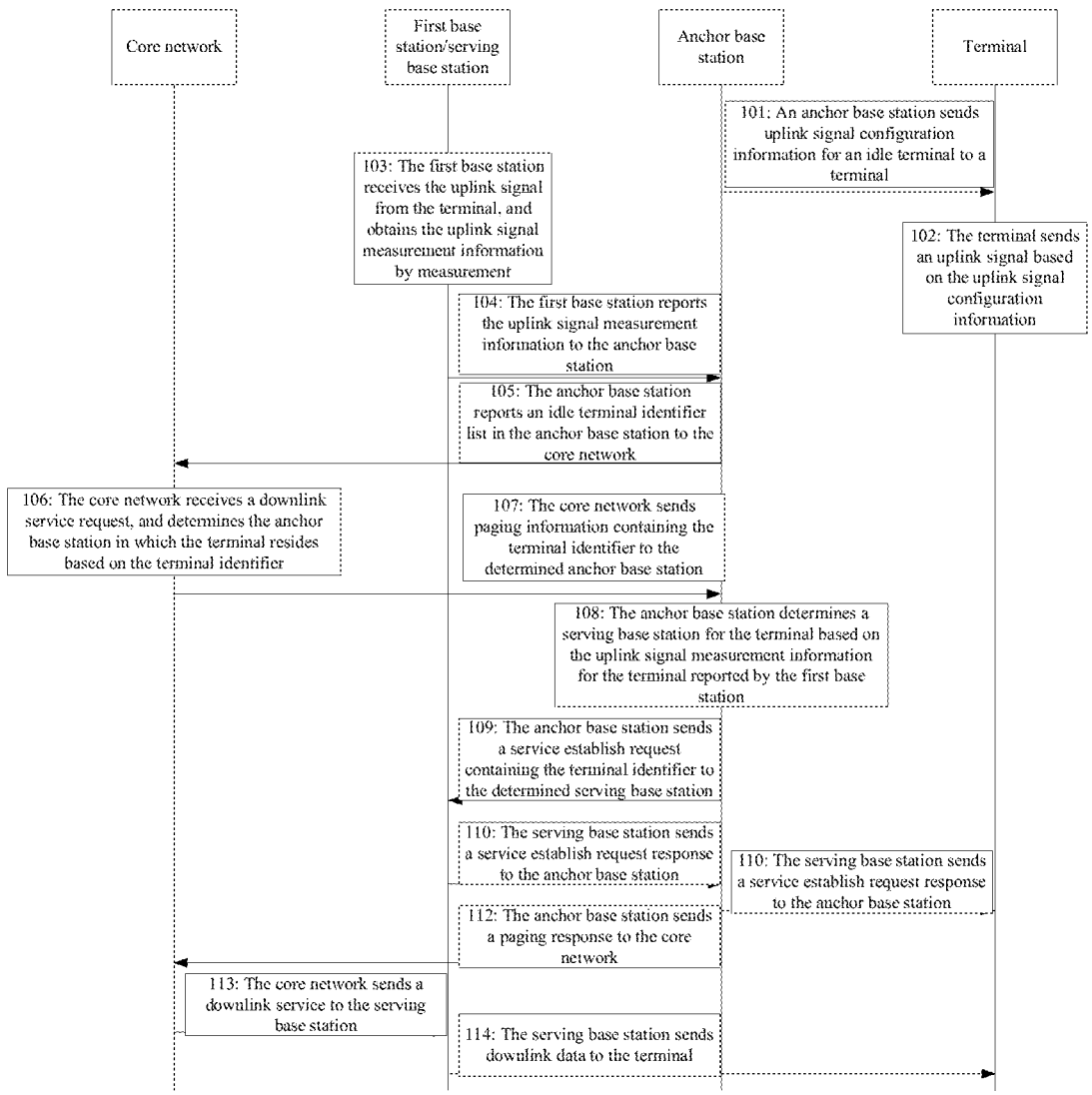
FIG. 2 is a flowchart of a terminal mobility management method according to an embodiment of the present application.

Firstly, processes of the entire solutions according to the embodiments of the present application are described in detail. FIG. 2 is a flowchart of a terminal mobility management method according to an embodiment of the present application. FIG. 3 is a schematic diagram of base station distribution and mobility management in a communication network. As illustrated in FIG. 3, ultra-dense networking in the 5G network may enable a terminal to be capable of simultaneously detecting 10 times or even more base stations relative to the 4G network. In FIG. 3, A denotes a basically covered cell, and B to F denote small cells providing ultra-high bandwidths. A has a largest coverage, and is an anchor base station in a coverage of base stations. The anchor base station is responsible for providing a mobility management service for a terminal based on uplink signal measurement information received from the terminal and reported by a plurality of base stations, and configures mobility for the terminal, for example, determining a serving base station for the terminal and perform location tracking for the terminal.

As illustrated in FIG. 2, the method includes the following steps:

Step 101: An anchor base station (or a mobility management server) sends uplink signal configuration information for an idle terminal to a terminal.

It should be noted that broadcast information of the anchor base station involves a number of partitions. Some partitions are directed to terminals in all the states (an idle state, a quasi-active state and an active state), some partitions are directed to the idle state, and some partitions are directed to the quasi-active state or the active state. These partitions are probably sent by the anchor base station in the same piece of broadcast information, and terminals in different states parse their desired information in different partitions. Therefore, the broadcast information sent by the anchor base station contains content for the idle terminal, for example, the uplink signal configuration information for the idle terminal.

Step 102: The terminal sends an uplink signal based on the uplink signal configuration information.

The uplink signal is sent by the terminal in the idle state where no service is requested. After the idle terminal sends the uplink signal based on the uplink signal configuration information, a first base station receiving the uplink signal measures the uplink signal to obtain uplink signal measurement information. Upon obtaining the uplink signal measurement information, the first base station firstly stores the obtained uplink signal measurement information, such that the first base station reports the information in the future when the terminal requests a service.

Step 103: The first base station receives the uplink signal from the terminal, and obtains the uplink signal measurement information by measurement.

One or more first base stations may be deployed. The first base station is pre-configured by the anchor base station based on a predetermined rule. For example, the anchor base station selects some base stations that are capable of implementing seamless communication connection within 5 kilometers to form the first base station. Alternatively, in some extreme occasions, only the anchor base station satisfies a selection condition of the first base station or the mobility management server only designates one first base station (a base station having an ultra-far coverage, that is, the anchor base station) to measure the uplink signal.

Step 104: The first base station reports the uplink signal measurement information to the anchor base station.

Only the first base station storing the uplink signal measurement information carrying the terminal identifier sends the uplink signal measurement information of the terminal to the anchor base station. That is, only the first base station which measures the uplink signal of the terminal sends the uplink signal measurement information.

Step 105: The anchor base station reports an idle terminal identifier list in the anchor base station to the core network.

Step 106: The core network receives a downlink service request, and determines the anchor base station in which the terminal resides based on the terminal identifier.

Upon receiving the downlink service request with respect to the terminal, the core network may determine the anchor base station in which the terminal resides based on the terminal identifier.

Step 107: The core network sends paging information containing the terminal identifier to the determined anchor base station.

Step 108: The anchor base station determines a serving base station for the terminal based on the uplink signal measurement information for the terminal reported by the first base station.

The anchor base station selects the serving base station based on a specific rule. The terminal may be located in an overlapping coverage region of a plurality of first base stations. It is possible that a plurality of first base stations are capable of receiving the uplink signal from the terminal. However, there is only one optimal serving base station. The serving base station may be determined based on the specific rule.

Step 109: The anchor base station sends a service establish request containing the terminal identifier to the determined serving base station.

Step 110: The serving base station sends a service establish request response to the anchor base station.

Step 111: The anchor base station sends the paging information to the terminal.

Step 112: The anchor base station sends a paging response to the core network.

Step 113: The core network sends a downlink service to the serving base station.

Step 114: The serving base station sends downlink data to the terminal.

As compared with the mobility management method based on downlink pilot signal/downlink reference signal measurement in the related art, in the embodiment of the present application, base station reselection or handover is not needed on the terminal side, the terminal only needs to send the uplink signal, and the first network device in the anchor base station or the mobility management server configures mobility for the terminal based on the uplink signal measurement information from the first base station and configures the candidate base station for the terminal. In this way, overhead and power consumption for the terminal to measure downlink signals from base stations inside the system and outside the system, frequent base station reselection and handover is prevented, the terminal does not need to consider network coverage and load, and the first network device determines a serving base station for the terminal. As such, the requirement of user-centered service provisioning in the 5G network is accommodated, and the serving base station is quickly assigned to the terminal when the terminal receives a downlink service request.

A first embodiment of the present application provides a terminal mobility management method. The method is applied to a network device in an anchor base station or a mobility management server. FIG. 4 is a flowchart of a terminal mobility management method according to a first embodiment of the present application. As illustrated in FIG. 4, the method includes the following steps:

Step 201: A first network device sends uplink signal configuration information for an idle terminal to a terminal.

The uplink signal is one or more of a reference signal, an anchor signal and a random access request signal. Core information of the reference signal, the anchor signal and the random access request signal includes a sequence that is known by a sending end (the terminal) and a receiving end (the first base station), for the first base station to perform energy detection and/or channel estimation. The above signals may also carry additional information following the known sequence. For example, identifier information of the terminal may be added to the random access request signal.

Step 202: The first network device receives uplink signal measurement information from a first base station, wherein the uplink signal measurement information is obtained by measurement by the first base station upon receiving an uplink signal carrying a terminal identifier sent by the terminal based on the uplink signal configuration information.

Step 203: The first network device configures mobility for the terminal based on the uplink signal measurement information, wherein the configuring mobility is configuring a serving base station for the terminal when a downlink service from the terminal arrives at a network side such that the terminal receives paging information from the serving base station.

In step 201, the first network device sends the uplink signal configuration information by the following steps:

The first network device configures a sending cycle or a type of a trigger event for an uplink signal of the idle terminal. The trigger event indicates that a downlink reference signal strength or downlink reference signal quality of a serving base station or an anchor base station of the terminal is less than a first predetermined threshold, or a time interval of the terminal since previous sending of the uplink signal exceeds a second predetermined threshold.

The first network device sends sending cycle configuration information for the uplink signal of the idle terminal or trigger event type configuration information for the uplink signal of the idle terminal or a report instruction directed to the terminal.

Therefore, the terminal may send the uplink signal in one or more of the following ways:

1. The terminal sends the uplink signal based on the sending cycle configured by the first network device for the uplink signal.

The sending cycle for the uplink signal may be a sending cycle pre-configured by the first network device for the uplink signal of the terminal based on a moving speed of the terminal. For example, when the moving speed of the terminal is high, the first network device configures a shorter sending cycle for the uplink signal; and on the contrary, when the moving speed of the terminal is low, the first network device configures a longer sending cycle for the uplink signal.

2. The terminal sends the uplink signal when the trigger event configured by the first network device is generated.

The trigger event indicates that the downlink reference signal strength or downlink reference signal quality of the serving base station or the anchor base station of the terminal is less than the first predetermined threshold, or the time interval of the terminal since previous sending of the uplink signal exceeds the second predetermined threshold. The first predetermined threshold and the second predetermined threshold maybe defined based on the actual needs. When the downlink reference signal strength or downlink reference signal quality of the serving base station or the anchor base station of the terminal is less than the first predetermined threshold, it is likely that the terminal is located at an edge of the serving base station or the anchor base station or other factors are present. In this case, base station handover is needed, and the terminal sends the uplink signal such that the first network device carries out mobility configuration such as base station handover or the like for the terminal. When the time interval of the terminal since previous sending of the uplink signal exceeds the second predetermined threshold, it indicates that it is a long time since base station reselection or base station handover was carried out for the terminal. In this case, mobility configuration may need to be carried out for the base station, such that the first network device selects a most suitable base station which provides services for the terminal.

3. The terminal sends the uplink signal when the first network device issues a report instruction to the terminal.

For example, when another terminal initiates a connection request to a terminal, the first network device may issue the report instruction to the terminal to be connected. In this case, the terminal receives the report instruction and sends the uplink signal, such that the first network device carries out mobility configuration such as base station selection or the like for the terminal, and a communication requirement between the another terminal and the terminal is accommodated.

In addition, the first network device may also configure a resource location for the idle terminal to send the uplink signal and sequence information contained in the uplink signal, and then send resource location configuration information for the idle terminal to send the uplink signal and sequence information configuration information contained in the uplink signal for the idle terminal to send the uplink signal.

The sequence information contained in the uplink signal may be a reference sequence, a special sequence, a random sequence, a known sequence or the like. The sequence information is mainly used for the terminal identifier. For example, a 1024-byte sequence length represents a specific terminal.

The resource location for the idle terminal to send the uplink signal and sequence information contained in the uplink signal, and the sending cycle for the uplink signal or the type of the trigger event for the uplink signal that are configured by the first network device are sent in broadcast information of the anchor base station. Nevertheless, the resource location for the idle terminal to send the uplink signal and sequence information contained in the uplink signal, and the sending cycle for the uplink signal or the type of the trigger event for the uplink signal may also be sent in control information of the anchor base station or at a specific resource location by an optimal service request access base station.

Prior to step 201, the method may further include the following steps:

The first network device configures the first base station, such that the first base station obtains the uplink signal measurement information by measurement upon receiving the uplink signal carrying the terminal identifier from the terminal based on the uplink signal configuration information.

Upon receiving a service request carrying the terminal identifier from the terminal, the first network device sends a measurement information report instruction carrying the terminal identifier to the first base station, such that the first base station sends the uplink signal measurement information.

The first network device may configure mobility for the terminal in one or more of the following ways:

1. selecting a base station having a highest signal strength or highest signal quality as the serving base station of the terminal based on the uplink signal measurement information; or 2. selecting a base station having a highest signal strength or having signal quality higher than a third predetermined threshold as the serving base station of the terminal based on the uplink signal measurement information; or the third predetermined threshold may be defined according to the actual needs; several qualified base stations may be selected as the serving base stations for the terminal, instead of selecting one only base station as the serving base station, such that more base station choices are provided for communication of the terminal;

3. selecting a base station having a signal strength or signal quality higher than a fourth predetermined threshold and having lowest load as the serving base station of the terminal based on the uplink signal measurement information and the load of the first base station.

The fourth predetermined threshold may be defined according to the actual needs. The base station may be selected further in combination with the load. For example, the base station having the signal strength or signal quality higher than the fourth predetermined threshold and having the lowest load is provided for the terminal as the serving base station. In this case, the base station may be selected as a target base station.

The terminal may be in an idle state, an active state or a quasi-active state. With respect to an idle terminal, the first network device notifies the configured candidate serving base station or serving base station to the idle terminal, such that the idle terminal sends an uplink service request based on the candidate serving base station or the serving base station; alternatively, the first network device configures paging information, and notifies the configured candidate serving base station or serving base station and the configured paging information to the idle terminal, wherein the paging information includes the terminal identifier, and the paging information is sent by the anchor base station or the candidate serving base station or the serving base station. With respect to an active or quasi-active terminal, the first network device notifies the configured serving base station to the active or quasi-active terminal, such that the active or quasi-active terminal establishes a connection to the serving base station.

Specifically, when the first network device configures mobility for the terminal, with respect to the idle terminal, the anchor base station determines an optimal paging base station or paging region for the terminal (accurate paging is needed when a downlink service request arrives) and/or an optimal service request access base station (initiated by an uplink service). The optimal paging base station or paging region is determined by the anchor base station. When the downlink service request arrives, the paging information containing the terminal identifier is sent in the optimal paging base station or paging region. The optimal service request access base station is determined by the anchor base station, and is sent in the broadcast information or the control information of the anchor base station or at the specific resource location by the optimal service request access base station. The terminal does not need base station reselection and measurement in the idle state, and the location of the terminal may be determined by the network side. When a service arrives, paging information or a service request maybe accurately initiated, which greatly lowers complexity and power consumption of measurement of the terminal.

With respect to an active or quasi-active terminal, the anchor base station determines a candidate serving base station or candidate serving base station set, a serving base station or serving base station set, and a handover base station or handover base station set, and an identifier of the candidate serving base station or an identifier sequence of the candidate serving base station set, an identifier of the serving base station or an identifier sequence of the serving base station set, and an identifier of the handover base station or an identifier sequence of the handover base station set corresponding to the terminal are sent in the broadcast information or the control information of the anchor base station or at a specific base station or a specific resource location by the mobility management server. The terminal only needs to carry out downlink synchronization with the candidate serving base station or candidate serving base station set and the serving base station or serving base station set, and receive data, or carry out downlink synchronization for the handover base station or handover base station set and initiates a handover request. As such, measurement of downlink local system and foreign system in the active state is not needed, which greatly lowers complexity and power consumption of measurement of the terminal.

It should be noted that when the first network device carries out mobility configuration for the terminal, generally one candidate serving base station is configured for the terminal. Nevertheless, a base station group may also be configured for the terminal. When the terminal initiates a service request, a base station is selected from the base station group based on a predetermined rule to provide services for the terminal. Therefore, in some embodiments, the first network device may also pre-configure a serving base station set for the terminal based on a moving direction and a moving speed of the terminal. FIG. 5 is a schematic diagram of a train application scenario according to an embodiment of the present application. As illustrated in FIG. 5, in an expressway or high-speed railway scenario, the terminal is in a moving state, and a serving base station set may be pre-configured for the terminal based on a moving direction and a moving speed of the terminal. The moving direction and the moving speed may be carried by the terminal in the reference signal, the anchor signal and the random access request signal, or may be acquired the anchor base station or the mobility management server based on joint positioning and speed estimation for the reference signal, the anchor signal and the random access request signal from the terminal by a plurality of base stations. Specifically, the moving direction and/or the moving speed of the terminal may be estimated based the uplink reference signal, the anchor signal and the random access request signal from the terminal reported by the plurality of base stations, or information of the moving direction and/or the moving speed of the terminal is carried in the reference signal, the anchor signal and the random access request signal from the terminal. The anchor base station or the mobility management server configures an optimal paging base station or region sequence, and/or an optimal service request access base station sequence for the terminal. When the terminal is moving: if a downlink service request arrives, the anchor base station sends paging information containing the terminal identifier in the optimal paging base station or paging region; and if an uplink service request arrives, the terminal initiates a service request in an optimal service request access base station. The above base stations are pre-configured accurately in a designated route, which greatly reduces an access or handover delay, and improves user experience.

The first network device identifies priorities of various base stations in the serving base station set, such that the terminal selects to access a serving base station having a highest priority. Alternatively, the terminal randomly selects a quasi-serving base station or a serving base station to access or a handover base station to hand over from the serving base station set or a handover base station set; or the terminal carries out downlink reference signal measurement for the base stations in the serving base station set or the handover base station set, and selects a quasi-serving base station or a serving base station having a highest signal receive strength or highest downlink reference signal quality to access or selects a handover base station.

In the embodiment of the present application, when the terminal sends an uplink signal (that is, reporting), which base station receives the uplink signal and whether the receiving is interrupted with mobility of the terminal do not need to be considered. The terminal only needs to report the information based on an instruction from the anchor base station. The anchor base station receives a measurement result of the reported information by the first base station, and determines a serving base station or serving base station set suitable for the terminal. When a downlink service arrives, the anchor base station may determine which base station or which base stations issue a paging instruction.

A second embodiment of the present application provides a terminal mobility management method. The method is applied to a network device in a first base station. FIG. 6 is a flowchart of the terminal mobility management method according to the second embodiment of the present application. As illustrated in FIG. 6, the method includes the following steps:

Step 301: A second network device receives an uplink signal carrying a terminal identifier sent from a terminal based on uplink signal configuration information for an idle terminal, and obtains uplink signal measurement information by measurement.

Step 302: The second network device sends the uplink signal measurement information to the first network device, such that the first network device configures mobility for the terminal based on the uplink signal measurement information, wherein the configuring mobility is configuring a serving base station for the terminal such that the terminal receives paging information at the serving base station.

The second network device is a device in a first base station. The first network device is a device in an anchor base station or a mobility management server.

The uplink signal is one or more of a reference signal, an anchor signal and a random access request signal.

The first base station to which the second network device belongs is configured by the first network device. The first network device configures the first base station, such that the first network device in the first base station receives uplink signal measurement information obtained by measurement by the terminal after the terminal sends the uplink signal carrying the terminal identifier based on the uplink signal configuration information.

Detailed practice and working principle of this embodiment may be referenced to the description in the first embodiment of the present application, which are thus not described herein any further.

A third embodiment of the present application provides a terminal mobility management method. The method is applied to a terminal. FIG. 7 is a flowchart of the terminal mobility management method according to the third embodiment of the present application. As illustrated in FIG. 7, the method includes the following steps:

Step 401: A terminal sends an uplink signal carrying a terminal identifier based on uplink signal configuration information for an idle terminal sent by a first network device, such that a first base station obtains uplink signal measurement information by measurement upon receiving the uplink signal, and the first network device receives the uplink signal measurement information from the first base station and configures mobility for the terminal based on the uplink measurement information, wherein the configuring mobility is configuring a serving base station for the terminal when a downlink service arrives at a network side, such that the terminal receives paging information at the serving base station.

The first network device is a device in an anchor base station or a mobility management server.

The uplink signal is one or more of a reference signal, an anchor signal and a random access request signal.

Detailed practice and working principle of this embodiment may be referenced to the description in the first embodiment of the present application, which are thus not described herein any further.

Figure 8:
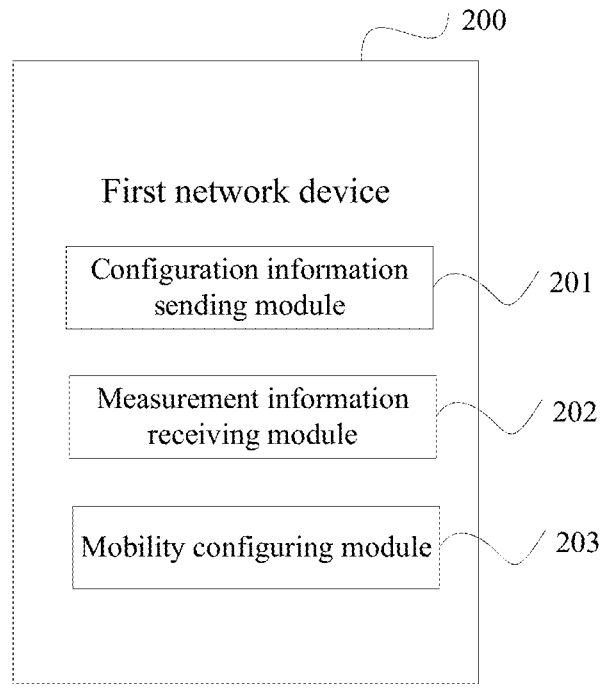
FIG. 8 is a block diagram of a first network device according to a fourth embodiment of the present application.

FIG. 8 is a block diagram of a first network device 200 according to a fourth embodiment of the present application. The first network device is a device in an anchor base station or a mobility management server. As illustrated in FIG. 8, the first network device 200 includes:

a configuration information sending module 201, configured to send uplink configuration information for an idle terminal to a terminal;

a measurement information receiving module 202, configured to receive from a first base station uplink signal measurement information, wherein the uplink signal measurement information is obtained by measurement by the first base station upon receiving an uplink signal carrying a terminal identifier from the terminal based on the uplink signal configuration information; and a mobility configuring module 203, configured to configure mobility for the terminal based on the uplink signal measurement information, wherein the configuring mobility is configuring a serving base station for the terminal when a downlink service from the terminal arrives at a network side, such that the terminal receives paging information from the serving base station.

The uplink signal is one or more of a reference signal, a anchor signal and a random access request signal.

The configuration information sending module 201 includes:

a cycle or event configuring unit, configured to configure a sending cycle or a type of a trigger event for an uplink signal of the idle terminal; and a cycle or event sending unit, configured to send sending cycle configuration information for the uplink signal of the idle terminal or trigger event type configuration information for the uplink signal of the idle terminal or a report instruction directed to the terminal.

The first network device 200 further includes:

a location and sequence configuring unit, configured to configure a resource location for the idle terminal to send the uplink signal and sequence information contained in the uplink signal; and a location and sequence sending unit, configured to send resource location configuration information for the idle terminal to send the uplink signal and sequence information configuration information contained in the uplink signal for the idle terminal to send the uplink signal.

The trigger event indicates that a downlink reference signal strength or downlink reference signal quality of a serving base station or an anchor base station of the terminal is less than a first predetermined threshold, or a time interval of the terminal since previous sending of the uplink signal exceeds a second predetermined threshold.

The cycle or event configuring unit is further configured to pre-configure a sending cycle of the uplink signal of the terminal based on a moving speed of the terminal.

The first network device 200 further includes: a first base station configuring module, configured to configure the first base station, such that the first base station obtains the uplink signal measurement information by measurement upon receiving the uplink signal carrying the terminal identifier from the terminal based on the uplink signal configuration information.

The mobility configuring module 203 is configured to select a base station having a highest signal strength or highest signal quality as the serving base station of the terminal based on the uplink signal measurement information; or select a base station having a highest signal strength or having signal quality higher than a third predetermined threshold as the serving base station of the terminal based on the uplink signal measurement information; or select a base station having a signal strength or signal quality higher than a fourth predetermined threshold and having lowest load as the serving base station of the terminal based on the uplink signal measurement information and the load of the first base station.

The mobility configuring module 203 is configured to notify the configured serving base station to an active or quasi-active terminal, such that the active or quasi-active terminal establishes a connection to the serving base station.

The mobility configuring module 203 is configured to:

report an idle terminal identifier list in an anchor base station to which the first network device 200 belongs to a core network, such that the core network determines an anchor base station in which the terminal resides based on the terminal identifier and sends the paging information containing the terminal identifier to the determined anchor base station upon receiving a downlink service request;

determine the serving base station of the terminal based on the uplink signal measurement information from the first base station;

send a service establish request containing the terminal identifier to the determined serving base station;

send the paging information to the terminal upon receiving a service establish request response from the determined serving base station; and send a paging response to the core network, such that the core network sends a downlink service to the determined serving base station, and hence the determined serving base station sends downlink service data to the terminal.

The mobility configuring module 203 is configured to pre-configure a serving base station set for the terminal based on a moving direction and a moving speed of the terminal.

The first network device 200 further includes: a priority identifying module, configured to identify priorities of various base stations in the serving base station set, such that the terminal select selects to access a serving base station having a highest priority.

Detailed practice and working principle of this embodiment may be referenced to the description in the first embodiment of the present application, which are thus not described herein any further.

Figure 9:
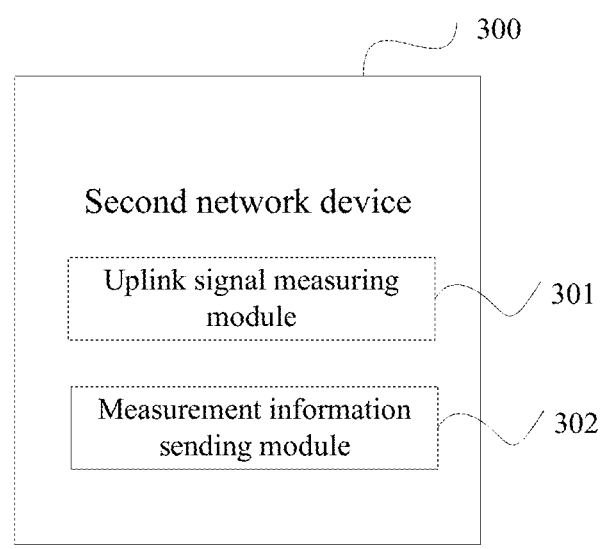
FIG. 9 is a block diagram of a second network device according to a fifth embodiment of the present application.

A fifth embodiment of the present application provides a second network device. FIG. 9 is a block diagram of a second network device 300 according to the fifth embodiment of the present application. As illustrated in FIG. 9, the second network device 300 includes:

an uplink signal measuring module 301, configured to receive an uplink signal carrying a terminal identifier sent from a terminal based on uplink signal configuration information for an idle terminal sent by a first network device, and obtain uplink signal measurement information by measurement; and a measurement information sending module 302, configured to send the uplink signal measurement information to the first network device, such that the first network device configures mobility for the terminal based on the uplink signal measurement information, wherein the configuring mobility is configuring a serving base station for the terminal such that the terminal receives paging information at the serving base station.

The second network device 300 is a device in a first base station. The first network device is a device in an anchor base station or a mobility management server.

The uplink signal is one or more of a reference signal, an anchor signal and a random access request signal.

The first base station to which the second network device 300 belongs is configured by the first network device. The first network device configures the first base station, such that the first network device in the first base station receives uplink signal measurement information obtained by measurement by the terminal after the terminal sends the uplink signal carrying the terminal identifier based on the uplink signal configuration information.

Detailed practice and working principle of this embodiment may be referenced to the description in the first embodiment of the present application, which are thus not described herein any further.

Figure 10:
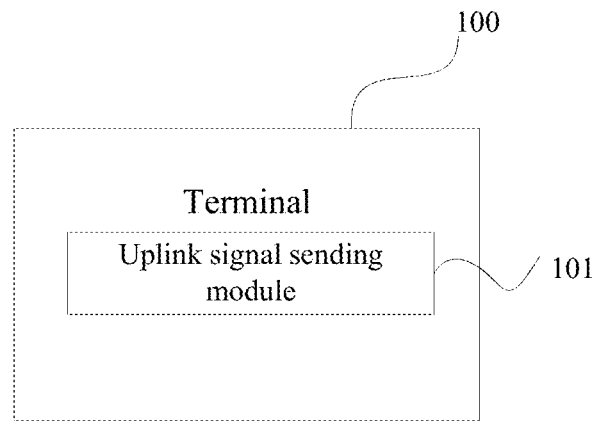
FIG. 10 is a block diagram of a terminal according to a sixth embodiment of the present application.

A sixth embodiment of the present application provides a terminal. FIG. 10 is a block diagram of a terminal 100 according to the sixth embodiment of the present application. As illustrated in FIG. 10, the terminal 100 includes:

an uplink signal sending module 101, configured to send an uplink signal carrying a terminal identifier based on uplink signal configuration information for an idle terminal sent by a first network device, such that a first base station obtains uplink signal measurement information by measurement upon receiving the uplink signal, and the first network device receives the uplink signal measurement information from the first base station and configures mobility for the terminal based on the uplink measurement information, wherein the configuring mobility is configuring a serving base station for the terminal when a downlink service arrives at a network side, such that the terminal receives paging information at the serving base station.

The first network device is a device in an anchor base station or a mobility management server.

The uplink signal is one or more of a reference signal, an anchor signal and a random access request signal.

Detailed practice and working principle of this embodiment may be referenced to the description in the first embodiment of the present application, which are thus not described herein any further.

Figure 11:
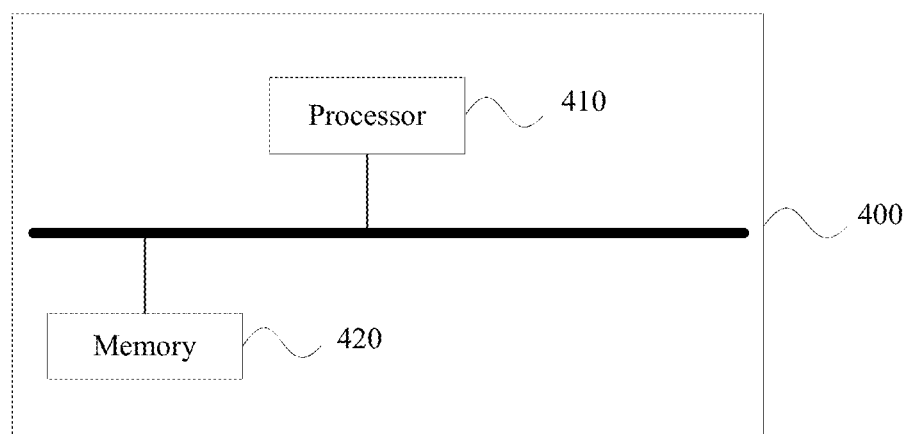
FIG. 11 is a block diagram of a first network device according to a seventh embodiment of the present application.

FIG. 11 is a block diagram of a first network device 400 according to a seventh embodiment of the present application. As illustrated in FIG. 11, the first network device 400 according to the seventh embodiment of the present application includes: at least one processor 410, wherein FIG. 11 uses one processor 410 as an example; and a memory 420 communicably connected to the at least one processor 410. The memory stores instructions that are executable by the at least one processor. The instructions, which when being executed by the at least one processor, cause the at least one processor to perform the terminal mobility management method applicable to the first network device 400 according to the method embodiments.

The at least one processor 410 and the memory 420 may be connected via a bus or in another manner, and FIG. 11 uses connection via the bus as an example.

The memory 420, as a non-volatile computer readable storage medium, may be configured to store non-volatile software programs, non-volatile computer executable programs and modules, for example, the program instructions/modules corresponding to the terminal mobility management method applicable to the first network device 400 according to the embodiments of the present application. The non-volatile software programs, instructions and modules stored in the memory 420, when being executed, cause the at least one processor 410 to perform various function applications and data processing of the first network device 400, that is, performing the terminal mobility management method applicable to the first network device 400 according to the above method embodiments.

The memory 420 may include a program memory area and data memory area, wherein the program memory area may store operation systems and application programs needed by at least function; and the data memory area may store data created according to the usage of the first network device 400. In addition, the memory 420 may include a high speed random access memory, or include a non-volatile memory, for example, at least one disk storage device, a flash memory device, or another non-volatile solid storage device. In some embodiments, the memory 420 optionally includes the memory remotely arranged relative to the processor 410, and such remote memory may be connected to the first network device 400 over a network. Examples of the above network include, but not limited to, the Internet, Intranet, local area network, mobile communication network and a combination thereof.

One or more modules are stored in the memory 420, and when being executed by the at least one processor 410, perform the terminal mobility management method applicable to the first network device 400 according to any one of the above method embodiments.

The product may perform the method according to the embodiments of the present application, has corresponding function modules for performing the method, and achieves the corresponding beneficial effects. For technical details that are not illustrated in detail in this embodiment, reference may be made to the description of the methods according to the embodiments of the present application.

Figure 12:
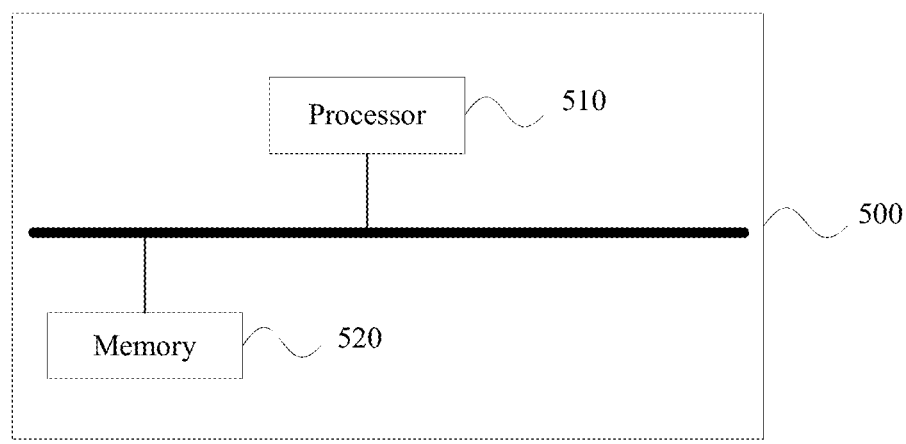
FIG. 12 is a block diagram of a second network device according to an eighth embodiment of the present application.

FIG. 12 is a block diagram of a second network device 500 according to an eighth embodiment of the present application. As illustrated in FIG. 12, the second network device 500 according to the eighth embodiment of the present application includes: at least one processor 510, wherein FIG. 12 uses one processor 510 as an example; and a memory 520 communicably connected to the at least one processor 510. The memory stores instructions that are executable by the at least one processor. The instructions, which when being executed by the at least one processor, cause the at least one processor to perform the terminal mobility management method applicable to the second network device 500 according to the method embodiments.

The at least one processor 510 and the memory 520 may be connected via a bus or in another manner, and FIG. 12 uses connection via the bus as an example.

The memory 520, as a non-volatile computer readable storage medium, may be configured to store non-volatile software programs, non-volatile computer executable programs and modules, for example, the program instructions/modules corresponding to the terminal mobility management method applicable to the second network device 500 according to the embodiments of the present application. The non-volatile software programs, instructions and modules stored in the memory 520, when being executed, cause the at least one processor 510 to perform various function applications and data processing of the second network device 500, that is, performing the terminal mobility management method applicable to the second network device 500 according to the above method embodiments.

The memory 520 may include a program memory area and data memory area, wherein the program memory area may store operation systems and application programs needed by at least function; and the data memory area may store data created according to the usage of the second network device 500. In addition, the memory 520 may include a high speed random access memory, or include a non-volatile memory, for example, at least one disk storage device, a flash memory device, or another non-volatile solid storage device. In some embodiments, the memory 520 optionally includes the memory remotely arranged relative to the processor 510, and such remote memory may be connected to the second network device 500 over a network. Examples of the above network include, but not limited to, the Internet, Intranet, local area network, mobile communication network and a combination thereof.

One or more modules are stored in the memory 520, and when being executed by the at least one processor 510, perform the terminal mobility management method applicable to the second network device 500 according to any one of the above method embodiments.

The product may perform the method according to the embodiments of the present application, has corresponding function modules for performing the method, and achieves the corresponding beneficial effects. For technical details that are not illustrated in detail in this embodiment, reference may be made to the description of the methods according to the embodiments of the present application.

Figure 13:
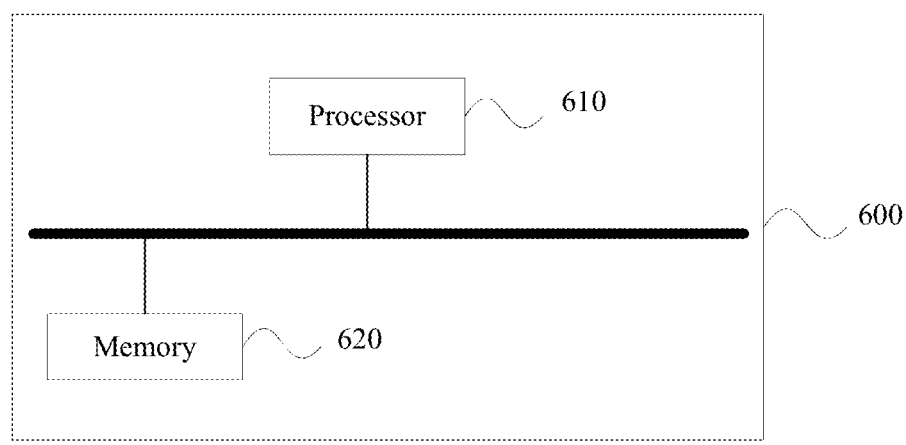
FIG. 13 is a block diagram of a terminal according to a ninth embodiment of the present application.

FIG. 13 is a block diagram of a terminal 600 according to a ninth embodiment of the present application. As illustrated in FIG. 13, the terminal 600 according to the ninth embodiment of the present application includes: at least one processor 610, wherein FIG. 13 uses one processor 610 as an example; and a memory 620 communicably connected to the at least one processor 610. The memory stores instructions that are executable by the at least one processor. The instructions, which when being executed by the at least one processor, cause the at least one processor to perform the terminal mobility management method applicable to the terminal 600 according to the method embodiments.

The at least one processor 610 and the memory 620 may be connected via a bus or in another manner, and FIG. 13 uses connection via the bus as an example.

The memory 620, as a non-volatile computer readable storage medium, may be configured to store non-volatile software programs, non-volatile computer executable programs and modules, for example, the program instructions/modules corresponding to the terminal mobility management method applicable to the terminal 600 according to the embodiments of the present application. The non-volatile software programs, instructions and modules stored in the memory 620, when being executed, cause the at least one processor 610 to perform various function applications and data processing of the terminal 600, that is, performing the terminal mobility management method applicable to the terminal 600 according to the above method embodiments.

The memory 620 may include a program memory area and data memory area, wherein the program memory area may store operation systems and application programs needed by at least one function; and the data memory area may store data created according to the use of the terminal 600. In addition, the memory 620 may include a high speed random access memory, or include a non-volatile memory, for example, at least one disk storage device, a flash memory device, or another non-volatile solid storage device. In some embodiments, the memory 620 optionally includes memories remotely configured relative to the processor 610. These memories may be connected to the terminal 600 over a network. Examples of the above network include, but not limited to, the Internet, Intranet, local area network, mobile communication network and a combination thereof.

One or more modules are stored in the memory 620, and when being executed by the at least one processor 610, perform the terminal mobility management method applicable to the terminal 600 according to any one of the above method embodiments.

The product may perform the method according to the embodiments of the present application, has corresponding function modules for performing the method, and achieves the corresponding beneficial effects. For technical details that are not illustrated in detail in this embodiment, reference may be made to the description of the methods according to the embodiments of the present application.

A tenth embodiment of the present application provides a non-volatile computer-readable storage medium. The computer-readable storage medium stores computer-executable instructions, which, when being executed by at least one processor, for example, the processor 410 as illustrated in FIG. 11, may cause the at least one processor to perform the terminal mobility management method applicable to the first network device according to any of the above method embodiments.

An eleventh embodiment of the present application provides a non-volatile computer-readable storage medium. The computer-readable storage medium stores computer-executable instructions, which, when being executed by at least one processor, for example, the processor 510 as illustrated in FIG. 12, may cause the at least one processor to perform the terminal mobility management method applicable to the second network device according to any of the above method embodiments.

A twelfth embodiment of the present application provides a non-volatile computer-readable storage medium. The computer-readable storage medium stores computer-executable instructions, which, when being executed by at least one processor, for example, the processor 610 as illustrated in FIG. 13, may cause the at least one processor to perform the terminal mobility management method applicable to the terminal according to any of the above method embodiments.

The above described apparatus embodiments are merely for illustration purpose only. The units which are described as separate components may be physically separated or may be not physically separated, and the components which are illustrated as units may be or may not be physical units, that is, the components may be located in the same position or may be distributed into a plurality of network units. A part or all of the modules may be selected according to the actual needs to achieve the objectives of the technical solutions of the embodiments.

According to the above embodiments of the present application, a person skilled in the art may clearly understand that the embodiments of the present application may be implemented by means of hardware or by means of software plus a necessary general hardware platform. Persons of ordinary skill in the art may understand that all or part of the steps of the methods in the embodiments may be implemented by a program instructing relevant hardware. The program may be stored in a computer readable storage medium and may be executed by at least one processor. When the program runs, the steps of the methods in the embodiments are performed. The storage medium may be any medium capable of storing program codes, such as read-only memory (ROM), a random access memory (RAM), a magnetic disk, or a compact disc-read only memory (CD-ROM).

Finally, it should be noted that the above embodiments are merely used to illustrate the technical solutions of the present application rather than limiting the technical solutions of the present application. Under the concept of the present application, the technical features of the above embodiments or other different embodiments may be combined, the steps therein may be performed in any sequence, and various variations may be derived in different aspects of the present application, which are not detailed herein for brevity of description. Although the present application is described in detail with reference to the above embodiments, persons of ordinary skill in the art should understand that they may still make modifications to the technical solutions described in the above embodiments, or make equivalent replacements to some of the technical features; however, such modifications or replacements do not cause the essence of the corresponding technical solutions to depart from the spirit and scope of the technical solutions of the embodiments of the present application.

What is claimed is:

1. A terminal mobility management method, comprising:
    sending, by a first network device, uplink signal configuration information for an idle terminal to a terminal;
    receiving, by the first network device, uplink signal measurement information sent by a first base station, wherein the uplink signal measurement information is obtained by measurement by the first base station upon receiving an uplink signal carrying a terminal identifier sent by the terminal based on the uplink signal configuration information; and
    configuring, by the first network device, mobility for the terminal based on the uplink signal measurement information, wherein the configuring mobility is configuring a serving base station for the terminal when a downlink service from the terminal arrives at a network side, such that the terminal receives paging information from the serving base station;
    wherein the method further comprises:
    configuring, by the first network device, the first base station, such that the first base station obtains the uplink signal measurement information by measurement upon receiving the uplink signal carrying the terminal identifier from the terminal based on the uplink signal configuration information;
    wherein the first network device is a device in an anchor base station or a mobility management server.

2. The method according to claim 1, wherein the uplink signal is one or more of a reference signal, an anchor signal and a random access request signal.

3. The method according to claim 1, wherein the sending, by a first network device, uplink signal configuration information for an idle terminal to a terminal comprises:
    configuring, by the first network device, a sending cycle or a type of a trigger event for an uplink signal of the idle terminal; and
    sending, by the first network device, sending cycle configuration information for the uplink signal of the idle terminal or trigger event type configuration information for the uplink signal of the idle terminal or a report instruction directed to the terminal.

4. The method according to claim 3, further comprising:
    configuring, by first the network device, a resource location for the idle terminal to send the uplink signal and sequence information contained in the uplink signal; and
    sending, by the first network device, resource location configuration information for the idle terminal to send the uplink signal and sequence information configuration information contained in the uplink signal for the idle terminal to send the uplink signal.

5. The method according to claim 3, wherein the trigger event indicates that a downlink reference signal strength or downlink reference signal quality of a serving base station or an anchor base station of the terminal is less than a first predetermined threshold, or a time interval of the terminal since previous sending of the uplink signal exceeds a second predetermined threshold.

6. The method according to claim 3, further comprising:
    pre-configuring, by the first network device, a sending cycle of the uplink signal of the terminal based on a moving speed of the terminal.

7. The method according to claim 1, wherein the configuring, by the first network device, mobility for the terminal based on the uplink signal measurement information comprises:
    selecting, by the first network device, a base station having a highest signal strength or highest signal quality as the serving base station of the terminal based on the uplink signal measurement information; or
    selecting, by the first network device, a base station having a highest signal strength or having signal quality higher than a third predetermined threshold as the serving base station of the terminal based on the uplink signal measurement information; or selecting, by the first network device, a base station having a signal strength or signal quality higher than a fourth predetermined threshold and having lowest load as the serving base station of the terminal based on the uplink signal measurement information and the load of the first base station.

8. The method according to claim 1, wherein the configuring, by the first network device, mobility for the terminal based on the uplink signal measurement information comprises:
notifying, by the first network device, the configured serving base station to an active or quasi-active terminal, such that the active or quasi-active terminal establishes a connection to the serving base station.

9. The method according to claim 1, wherein the configuring, by the first network device, mobility for the terminal based on the uplink signal measurement information comprises:
reporting, by the first network device, an idle terminal identifier list in an anchor base station to which the first network device belongs to a core network, such that the core network determines an anchor base station in which the terminal resides based on the terminal identifier and sends the paging information containing the terminal identifier to the determined anchor base station upon receiving a downlink service request;
determining, by the first network device, the serving base station of the terminal based on the uplink signal measurement information from the first base station;
sending, by the first network device, a service establish request containing the terminal identifier to the determined serving base station;
sending, by the first network device, the paging information to the terminal upon receiving a service establish request response from the determined serving base station; and
sending, by the first network device, a paging response to the core network, such that the core network sends a downlink service to the determined serving base station, and hence the determined serving base station sends downlink service data to the terminal.

10. The method according to claim 1, further comprising:
pre-configuring, by the first network device, a serving base station set for the terminal based on a moving direction and a moving speed of the terminal.

11. The method according to claim 9, further comprising:
identifying, by the first network device, priorities of various base stations in the serving base station set, such that the terminal selects to access a serving base station having a highest priority.

12. A terminal mobility management method, comprising:
receiving, by a second network device, an uplink signal carrying a terminal identifier sent from a terminal based on uplink signal configuration information for an idle terminal sent by a first network device;
obtaining, by a second network device, uplink signal measurement information by measurement; and
sending, by the second network device, the uplink signal measurement information to the first network device, such that the first network device configures mobility for the terminal based on the uplink signal measurement information, wherein the configuring mobility is configuring a serving base station for the terminal such that the terminal receives paging information at the serving base station;
wherein the second network device is a device in a first base station being configured by the first network device, and wherein the first network device configures the first base station, such that the second network device in the first base station obtains uplink signal measurement information by measurement upon receiving an uplink signal carrying a terminal identifier sent by the terminal based on the uplink signal configuration information;
wherein the first network device is a device in an anchor base station or a mobility management server.

13. The method according to claim 12, wherein the uplink signal is one or more of a reference signal, an anchor signal and a random access request signal.

14. A first network device, comprising:
at least one processor; and
a memory communicably connected to the at least one processor; wherein
the memory stores instructions executable by the at least one processor, wherein, the instructions, when being executed by the at least one processor, cause the at least one processor to perform the steps of:
sending uplink signal configuration information for an idle terminal to a terminal;
receiving uplink signal measurement information sent by a first base station, wherein the uplink signal measurement information is obtained by measurement by the first base station upon receiving an uplink signal carrying a terminal identifier sent by the terminal based on the uplink signal configuration information; and
configuring mobility for the terminal based on the uplink signal measurement information, wherein the configuring mobility is configuring a serving base station for the terminal when a downlink service from the terminal arrives at a network side, such that the terminal receives paging information from the serving base station;
wherein the method further comprises:
configuring, by the first network device, the first base station, such that the first base station obtains the uplink signal measurement information by measurement upon receiving the uplink signal carrying the terminal identifier from the terminal based on the uplink signal configuration information;
wherein the first network device is a device in an anchor base station or a mobility management server.

15. The first network device according to claim 14, wherein the uplink signal is one or more of a reference signal, an anchor signal and a random access request signal.

16. The first network device according to claim 14, wherein the sending uplink signal configuration information for an idle terminal to a terminal comprises:
configuring a sending cycle or a type of a trigger event for an uplink signal of the idle terminal; and
sending cycle configuration information for the uplink signal of the idle terminal or trigger event type configuration information for the uplink signal of the idle terminal or a report instruction directed to the terminal.

17. The first network device according to claim 14, wherein the instructions, when being executed by the at least one processor, cause the at least one processor to perform the steps of:
configuring a resource location for the idle terminal to send the uplink signal and sequence information contained in the uplink signal; and
sending resource location configuration information for the idle terminal to send the uplink signal and sequence information configuration information contained in the uplink signal for the idle terminal to send the uplink signal.

* * * * *